United States Patent Office 3,375,257
Patented Mar. 26, 1968

3,375,257
N-(ACYL AMINO SUBSTITUTED PYRIDYL)-N-(PHENYL OR PYRIDYL)AMINES
Kurt Thiele, Günter Steinmetz, and Walter von Bebenburg, Frankfurt am Main, Germany, assignors to Deutsche Gold- und Silber-Scheideanstalt vormals Roessler, Frankfurt am Main, Germany
No Drawing. Filed Aug. 23, 1965, Ser. No. 481,938
Claims priority, application Germany, Aug. 29, 1964, D 45,302, D 45,303
5 Claims. (Cl. 260—295)

ABSTRACT OF THE DISCLOSURE

Compounds of the formula

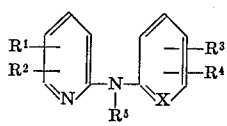

wherein X is selected from the group consisting of nitrogen and —CH—, $R^1$ is an amino acyl group $R^6NH$, wherein $R^6$ is an acyl group derived from an acid selected from the group consisting of carbonic acid, mono lower alkyl esters of carbonic acid, lower alkanoic acids, benzoic acid, chloro substituted benzoic acids and hydroxy substituted benzoic acids, $R^2$ is, for instance, selected from the group consisting of hydrogen, halogen, amino and acyl amino as defined for $R^1$, $R^3$ and $R^4$ are, for instance, selected from the group consisting of hydrogen, halogen, trifluoromethyl, alkyl, alkoxy, carboxy and amino and $R^5$ is selected from the group consisting of hydrogen and acyl as defined for $R^6$. The compounds of this invention have valuable pharmaceutical properties because of their high antiphlogistic action indicating their usefulness as anti-inflammatory agents.

The present invention relates to novel compounds having valuable pharmaceutical properties of the formula

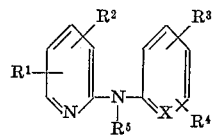

in which X signifies nitrogen or a CH group, $R^1$, $R^2$, $R^3$ and $R^4$ are each selected from the group consisting of hydrogen, halogen, trifluoromethyl, —CN, thiocyanate, alkyl, mercapto, alkyl thio, hydroxy, alkoxy, carboxyl, carbalkoxy, carbamino, carboxyamino, amino, alkylamino, acylthio, acyloxy, acylamino and acylamino substituted with a morpholino group, in which the acyl groups indicated are derived from carbonic acid and its monoesters, benzoic acid, preferably, substituted benzoic acids, or mono- or dicarboxylic aliphatic acids having 1 to 6 carbon atoms and $R^5$ is hydrogen or an acyl group of the type indicated above. $R^1$ cannot be hydrogen when $R^2$ through $R^5$ all are hydrogen. The substituents concerned on acyl radicals derived from benzoic acid are: halogen, hydroxy, trifluoromethyl, alkyl, alkoxy, acyloxy, amino, alkylamino, acylamino, —CN, isocyanato, nitro, mercapto, alkylthio, acylthio, carboxy, carbethoxy and carbamino groups.

The preferred compounds are those in which $R^1$ is an aminoacyl group $R^6NH$— wherein $R^6$ is an acyl group derived from carbamic acid, a mono lower alkyl ester of carbonic acid, a lower alkanoic acid, a morpholino substituted lower alkanoic acid, benzoic acid, chloro and hydroxy substituted benzoic acids. When $R^5$ is acyl it preferably is an acyl radical as defined for $R^6$.

The compounds according to the invention have valuable pharmaceutical properties and are especially useful because of their high antiphlogistic action which they possess on oral administration. The compounds, for example, on oral administration in doses of 20–300 mg./kg. have a strong anti-inflammatory effect on Formalin-albumen edema on rat paws. The compounds on oral administration are toxic to rats in doses over 550 mg./kg.

The following examples will serve to illustrate the invention with reference to a number of representative compounds.

Example 1

(a) 2-phenylamino-5-acetamino-pyridine

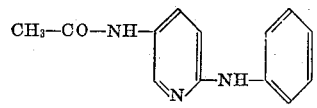

18.5 g. of 2-phenylamino-5-amino-pyridine were reacted with 9.5 ml. acetic acid anhydride in 40 ml. of dioxane at 40 to 50° C. The 5-acetamino derivative precipitated out after a short time. It was recrystallized from dioxane. The melting point thereof was 177° C.

(b) 2-phenylamino - 5 - propionylamino - pyridine was prepared analogously using propionic acid anhydride instead of acetic acid anhydride. Its melting point after recrystallization from ethanol was 172° C.

Example 2

N-[2-phenylamino-pyridyl-(5)]-carbamic acid ethyl ester

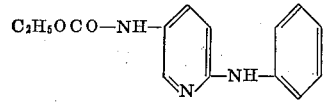

9.3 g. of 2-phenylamino-5-amino-pyridine were reacted with 4.8 ml. of chloroformic acid ethyl ester in 30 ml. of dioxane and 6 ml. of pyridine. After 1 hour the solvent was distilled off under vacuum and the residue dissolved in chloroform and washed with water. Thereafter the chloroform was distilled off and the residue recrystallized from ethanol. The melting point of the product was 141° C.

Example 3

(a) 2-(N-phenyl-N-propionyl amino) - 5 - acetaminopyridine

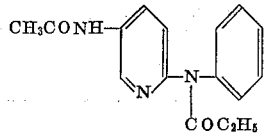

10 g. of 2-phenylamino-5-acetamino-pyridine (product of Example 1(a)) were boiled together with 6.3 g. of propionic acid anhydride in 40 ml. of dioxane for 5 hours. After the dioxane was distilled off the residue was dissolved in benzene and washed with dilute NaOH. The benzene was distilled off and the residue recrystallized from ethanol. The melting point of the product was 146–148° C.

(b) 2 - (N - phenyl - N - propionylamino) - 5 - propionylamino-pyridine was prepared analogously using the 5-propionylamino compound of Example 1(b) as starting material instead of the 5-acetamino compound. Its melting point after recrystallization from an ethanol-gasoline mixture was 124° C.

Example 4

(a) N - phenyl - N - [5 - acetaminopyridyl - (2)]-carbamic acid ethyl ester

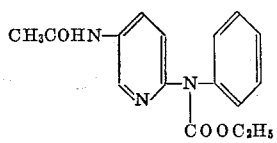

15 g. of 2-phenylamino-5-acetamino-pyridine (product of Example 1(a)) and 6.3 g. of chloroformic acid ethyl ester were boiled together with 11.3 g. of $K_2CO_3$ in 60 ml. of dioxane for 3 hours. Thereafter the reaction mixture was filtered and the dioxane distilled off. The residue was recrystallized from ethanol. The melting point of the product was 160° C.

(b) N-phenyl - N - [5-propionylamino-pyridyl-(2)]-carbamic acid ethyl ester was prepared analogously using the 5-propionyl compound of Example 1(b) as the starting material instead of the 5-acetamino compound. Its melting point was 159° C.

(c) N-phenyl - N - [5-carbethoxyamino-pyridyl-(2)]-carbamic acid ethyl ester

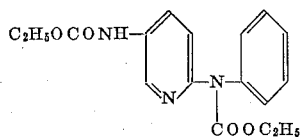

was prepared analogously using the product of Example 2 as starting material instead of the 2-acetamino compound. The melting point of the compound after recrystallization from an ethanol-gasoline mixture was 92° C.

Example 5

2-(N - phenyl-N-4-chlorobenzamino)-5-carboxyamino-pyridine

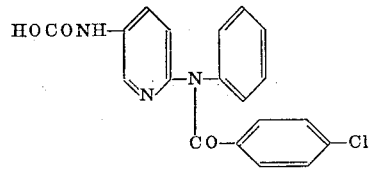

18 g. of N-[2-phenylaminopyridyl-(5)]-carbamic acid ethyl ester (product of Example 2), 13.3 g. of p-chlorobenzoyl chloride and 12 g. of $Na_2CO_3$ were boiled together in benzene for 5 hours. Thereafter water containing dimethyl formamide was added and the mixture boiled for 1 hour further in order to effect saponification. The solvent was then distilled off and the residue recrystallized from ethanol. The melting point of the product was 190° C.

Example 6

2-(3-trifluoromethylphenylamino)-5-amino-pyridine

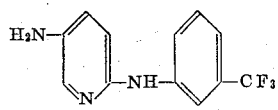

2-(3 - trifluoromethylphenylamino) - 5 - nitro-pyridine (prepared by reacting 3-trifluoromethylaniline with 2-chloro-5-nitro-pyridine at about 180° C.) was hydrogenated with Raney nickel as catalyst in methanol at 70° C. at 20 to 30 atmospheres gauge pressure. After the solvent was distilled off the residue was distilled over under a pressure of 0.5 torr at 190-192° C. The product formed a crystalline salt with maleic acid which after recrystallization from isopropanol melted at 115° C.

Example 7

(a) 2-(3-trifluoromethylphenylamino) - 5 - acetaminopyridine

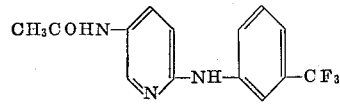

101 g. of 2-(3-trifluoromethylphenylamino)-5-aminopyridine (product of Example 6) were reacted with 38 ml. of acetanhydride in 200 ml. of benzene in a manner analogous to Example 1(a). After recrystallization from ethanol the compound had a melting point of 196° C.

(b) 2-(3-trifluoromethylphenylamino) - 5 - propionyl amino-pyridine was prepared analogously using propionic acid anhydride instead of acetic acid anhydride. After recrystallization from isopropanol its melting point was 166° C.

Example 8

N-{2 - [3-trifluoromethylphenylamino] - pyridyl-(5)}-carbamic acid ethyl ester

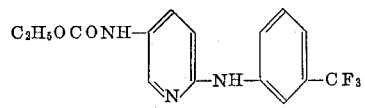

65 g. of the product of Example 6 were reacted with 24.5 ml. of chloroformic acid ethyl ester in 200 ml. of acetone and 30 ml. of pyridine analogously to Example 2. After recrystallization from ethanol the product had a melting point of 175° C.

Example 9

2 - (N-3-trifluoromethylphenyl-N-propionylamino) - 5-propionyl-amino-pyridine

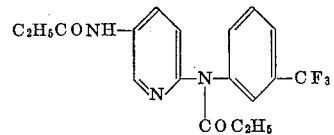

15 g. of the product of Example 7(b) were reacted with 6.5 g. of propionic acid anhydride in 50 ml. dioxane analogously to Example 3. After recrystallization from an ethanol-gasoline the product had a melting point of 118° C.

Example 10

(a) N-(3-trifluoromethylphenyl) - N - [5-acetaminopyridyl-(2)]-carbamic acid ethyl ester

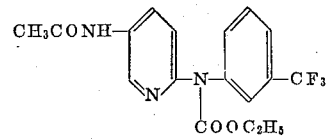

14.7 g. of the product of Example 7(a), 4.8 g. of chloroformic acid ethyl ester and 8.7 g. of $K_2CO_3$ were reacted in 40 ml. of dioxane analogously to Example 4(a). After recrystallization from an ethanol-gasoline mixture the melting point of the product was 136° C.

(b) N-(3-trifluoromethylphenyl) - N - [5-carbethoxyaminopyridyl(2)]-carbamic acid ethyl ester was prepared analogously using the product of Example 8 instead of that of Example 7(a). After recrystallization from a benzene-gasoline mixture its melting point was 100–102° C.

Example 11

2-(3-trifluoromethylphenylamino) - 5 - (4-chlorobenzamino)-pyridine

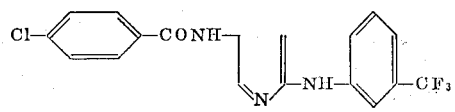

10.1 g. of the product of Example 6 were reacted with 5 g. of p-chlorobenzoylchloride in 40 ml. of dioxane and 5 ml. of pyridine at 40–50° C. After 2 hours the dioxane was distilled off under vacuum and the residue dissolved in 150 ml. of hot benzene and washed with hot water. The compound crystallized from the benzene on cooling. After recrystallization from dioxane its melting point was 208° C.

*Example 12*

(a) N-{2 - [3-trifluoromethylphenylamino] - pyridyl-(5)}-carbonic acid amide morpholide

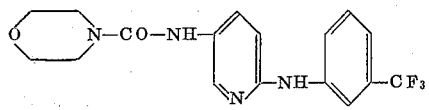

20 g. of N-{2-[3-trifluoromethylphenylamino]-pyridyl-(5)}-carbamic acid phenyl ester, prepared analogously to Example 2 from the product of Example 6 and chloroformic acid phenyl ester, were reacted with 9 g. of morpholine at 140° C. After 30 minutes the melt was dissolved in benzene and washed with dilute NaOH. The benzene was distilled off and the residue recrystallized from an ethanol-gasoline mixture. The melting point of the product was 84–86° C.

(b) N-{2 - [3-trifluoromethylphenylamino] - pyridyl-(5)}-carbamic acid morpholino ethyl ester

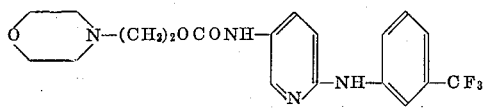

was prepared analogously using morpholinoethanol in place of the morpholine for the transesterification. The hydrochloride was recyrstallized from isopropanol and had a melting point of 200° C.

*Example 13*

2-[N-(3-trifluoromethylphenyl) - 4 - chlorobenzamino]-5-carbethoxyaminopyridine

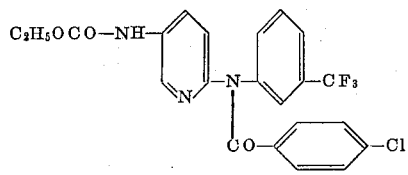

20 g. of the compound of Example 8 were reacted with 14 g. of chlorobenzoyl chloride by boiling in 106 ml. of dioxane in the presence of 14 g. of $K_2CO_3$. After 2 hours the reaction mixture was filtered and the filtrate boiled down under vacuum. The residue after recrystallization from benzene had a melting point of 135° C.

*Example 14*

2-(4-pentyloxyphenylamino)-5-amino-pyridine

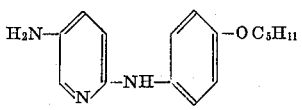

2-(4-pentyloxyphenylamino)-5-nitro-pyridine (prepared by reacting 4-pentoxyaniline with 2-chloro-5-nitro-pyridine) was hydrogenated and processed analogously to Example 6. The base boils at 0.5 torr between 225–235° C.

*Example 15*

2-(4-pentyloxyphenylamino)-5-acetamino-pyridine

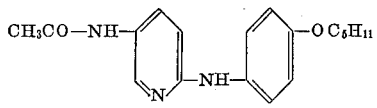

was prepared from the product of Example 14 and acetic acid anhydride in a manner analogous to Example 1. After recrystallization from ethanol the product had a melting point of 167° C.

*Example 16*

2-phenylamino-5-salicylamino-pyridine

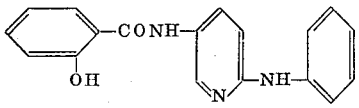

11 g. of 2-phenylamino-5-amino-pyridine were heated with 13 g. of salicylic acid phenyl ester at 180° C. for 2 hours. After the reaction mixture cooled down it was dissolved in ethanol from which it crystallized with one mol of crystal alcohol. The melting point thereof was 171° C.

*Example 17*

2-phenylamino-3-chloropyridine

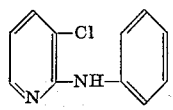

15 g. of 2,3-dichloropyridine were introduced into 19 g. of boiling aniline and the temperature then raised to 210° C. After 15 minutes the mixture was cooled and taken up in benzene, washed with water and the benzene distilled off. The residue was fractionated under vacuum, the base distilled over at 12 torr at 178–180° C. After recrystallization from gasoline its melting point was 49–50° C.

*Example 18*

2-[3-methylpyridyl-(2)-amino]-5-chloro-pyridine

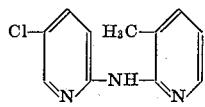

32.4 g. of 2-amino-3-methyl-pyridine were reacted with 24 g. of a 50% suspension of sodium amide in toluene in 200 ml. of boiling toluene. Subsequently 44.2 g. of 2,5-dichloropyridine in 100 ml. of toluene were added gradually in portions. After 3 hours the reaction mixture was washed with water and the toluene distilled off. The residue was fractionated under vacuum. The base distilled over at 0.5 torr between 140 and 158° C. After recrystallization from isopropanol its melting point was 68–69° C.

*Example 19*

(a) 2-(2-methyl-phenylamino)-5-amino-pyridine

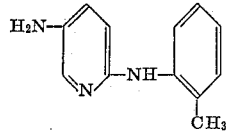

126 g. of 2-(methyl-phenyl-amino) - 5 - nitro-pyridine were suspended in 1.2 l. of methanol and hydrogenated in the presence of 13 g. of Raney nickel at 60° C. at 50 atmospheres in an autoclave. After the catalyst was filtered off, the filtrate was evaporated down and the residue distilled under vacuum. The product distilled over at 0.2 torr between 178–185° C. Yield=95 g.

(b) 2-(2,3-dimethyl-phenyl-amino) - 5 - amino-pyridine was produced analogously from 204 g. of 2-(2,3-dimethyl-phenyl-amino)-5-nitro-pyridine. The product distilled over at 0.7 torr between 200–205° C. Its melting point was 105° C. Yield=163 g.

(c) 2-(4-fluoro-phenyl-amino)-5-amino-pyridine was produced analogously from 2-(4-fluoro-phenyl-amino)-5-nitro-pyridine. It was recrystallized from an ethanol-gasoline mixture. The melting point of the product was 141° C. Yield=90%.

(d) 2-(2-methyl - 5 - chloro-phenyl-amino)-5-amino-pyridine was produced analogously from 2-(2-methyl-5- chloro-phenyl-amino)-5-nitro-pyridine. The product distilled over at 0.5 torr between 190–195° C. Yield=92%.

Example 20

(a) N-[2-(2 - methyl-phenyl-amino)-pyridyl - (5)]-carbamic acid ethyl ester

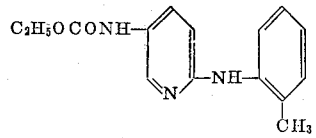

20 g. of the product of Example 19(a) were reacted at 25° C. with 9.6 ml. of chloroformic acid ethyl ester in 100 ml. of acetone in the presence of 8 ml. of pyridine. The acetone was boiled off and the residue taken up in benzene and shaken with dilute NaOH. The benzene solution was boiled down and the residue recrystallized from an ethanol-gasoline mixture. The melting point of the product was 128° C. Yield=11 g.

(b) N-[2-(2,3 - dimethyl-phenyl-amino)-pyridyl-(5)]-carbamic acid ethyl ester was produced analogously using 51.3 g. of the product of Example 19(b) instead of that of Example 19(a). The melting point of the product was 128° C. Yield=56 g.

(c) N-[2-(4 - fluoro-phenyl-amino)-pyridyl-(5)]-carbamic acid ethyl ester was produced analogously using 31 g. of the product of Example 19(c) instead of that of Example 19(a). The melting point of the product was 138° C. Yield=20 g.

(d) N-[2-(2-methyl - 5 - chloro-phenyl-amino)-pyridyl-(5)]-carbamic acid ethyl ester was produced analogously using the product of Example 19(d) instead of that of Example 19(a). The melting point of the product was 123° C. Yield=43%.

Example 21

2-(2,3-dimethyl-phenyl-amino)-5-morpholino-carbonyl-amino-pyridine

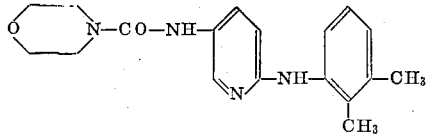

20 g. of the product of Example 20(b) were heated with an excess of morpholine for 2 hours at 130° C. The reaction product was recrystallized from methyl ethyl ketone. The melting point of the product was 166° C. Yield=6 g.

Example 22

N,N-diallyl-N'-[2,3-dimethyl-phenyl - amino - pyridyl-(5)]-urea

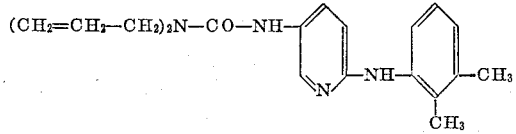

18 g. of the product of Example 20(b) were reacted with an excess of diallyl amine analogously to Example 21 except that a little sodium methylate was added as a catalyst. After recrystallization of the reaction product from methyl ethyl ketone its melting point was 143° C. Yield=9 g.

Example 23

2-(4-morpholinoethoxy-phenyl-amino) - 5 - amino-pyridine

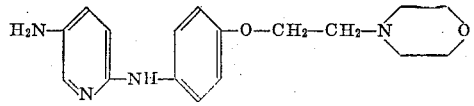

was produced by reduction of 2-(4-morpholinoethoxy-phenyl-amino)-5-nitro-pyridine as in Example 19(a). The product was purified by distillation under vacuum. It distilled over at 0.5 torr between 285°–290° C. Yield=83%.

Example 24

2-(4-morpholinoethoxy-phenyl-amino) - 5 - acetamino-pyridine

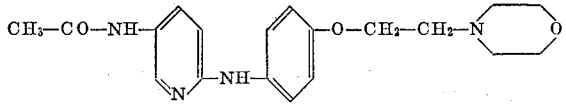

15 g. of the product of Example 23 were dissolved in 100 ml. of benzene and 4.5 ml. of acetic acid anhydride added thereto at 40–50° C. After 1 hour the reaction mixture was washed with dilute NaOH. The benzene solution was concentrated, whereupon the product crystallized out. After recrystallization from methyl ethyl ketone/ether it had a melting point of 144° C. Yield=6 g.

Example 25

2-[3-butyl-carbamoyl-phenyl-amino]-5-amino-pyridine

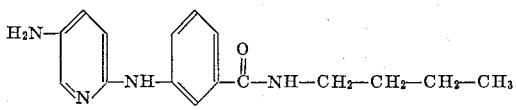

80 g. of 2-[3-butyl-carbamoyl-phenyl-amino]-5-nitro-pyridine were suspended in 1 l. of acetone and hydrogenated in the presence of 10 g. of Raney nickel at 75° C. under a pressure of 50 atmospheres. The reaction solution was boiled down and the water produced in the reaction entrained with benzene. The reaction product obtained was syrupy.

Example 26

N-{2-[3-butyl-carbamoyl-phenyl-amino] - pyridyl-(5)} carbamic acid ethyl ester

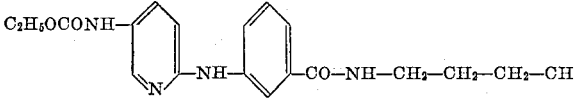

was prepared from the product of Example 25 in a manner analogous to Example 20(a). After recrystallization from ethanol the product had a melting point of 163° C.

Example 27

2-(o-carboxyphenylamino)-3-amino-5-chloro-pyridine

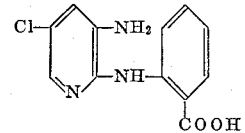

40 g. of 2-(o-carboxyphenylamino)-3-nitro-5-chloro-pyridine were hydrogenated in 1 liter of ethanol in the presence of 20 g. of Raney nickel at 60° C. under 60 atmospheres gauge pressure. After the catalyst was filtered off the reaction mixture was concentrated to 100 ml. and then the amine product which crystallized out filtered off therefrom. After such product had been recrystallized from 350 ml. of propanol it had a melting point of 248° C. Yield=16 g.

Example 28

2-(o-carboxyphenylamino)-3-(p-chlorobenzamino) - 5-chloro-pyridine

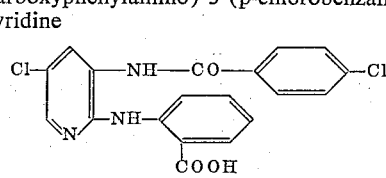

A mixture of 10 g. of the product of Example 27, 80 ml. of pyridine, 50 ml. of p-chlorobenzoyl chloride was heated under reflux for 10 minutes. After cooling the crystallized

Example 29

2-phenylamino-3-amino-5-chloro-pyridine

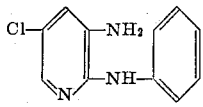

110 g. of 2-anilino-3-nitro-5-chloro-pyridine were hydrogenated in 2.6 l. of ethanol with 50 g. of Raney nickel at 20° C. at a gauge pressure of 20 atmospheres. After the catalyst was lItered off the filtrate was acidified with HCl and boiled down to dryness. The residue was dissolved in water and the base liberated with aqueous $Na_2CO_3$. After thorough cooling the precipitated base was filtered off and recrystallized from cyclohexane containing active carbon. The melting point of the product was 144–145° C. Yield=60 g.

Example 30

2-phenylamino-3-acetamino-5-chloro-pyridine

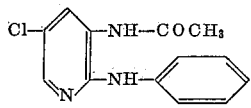

A mixture of 10.8 g. of 2-anilino-3-amino-5-chloropyridine, 43.2 ml. of pyridine and 4.8 g. of acetic acid anhydride was boiled for 2 minutes, allowed to stand overnight and then poured into water. The precipitated substance crystallized upon rubbing. It was filtered off, washed with water and recrystallized from ethanol. Its melting point was 130–133° C. Yield=9 g.

Example 31

2,3-diamino-6-(3-trifluoromethyl-phenyl-amino) - pyridine

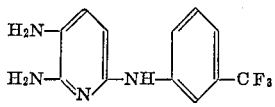

115 g. (0.5 mol) of 2-amino - 3 - nitro-6-(3-trifluoromethyl-phenyl-amino)-pyridine were hydrogenated in 500 ml. of dioxane containing 12 g. Pd/active carbon (10%) and 60 g. of $Na_2SO_4$ at 50° C. under a gauge pressure of 50 atmospheres. After filtering 100 ml. of ether were added to the filtrate and then sufficient gasoline so that clouding occurred. The base which crystallized out was filtered rapidly as it was sensitive to air. Yield 70 g. Upon addition of isopropanolic HCl to a solution of the amine in ethanol the hydrochloride precipitated out. Its melting point was 300° C. (with decomposition).

Example 32

2 - amino - 3 - carbethoxyamino-6-(trifluoromethyl-phenyl-amino)-pyridine.HCl

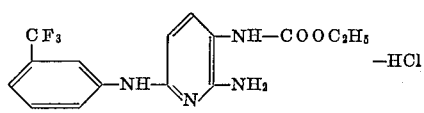

20 g. of chloroformic acid ethyl ester were added to 15 g. of the product of Example 31 in 100 ml. of dioxane. The reaction product which crystallized out was filtered off and recrystallized twice from water. Its melting point was 185–192° C. Yield=8 g.

Example 33

2,3-diamino-6-pyridyl-2-amino-pyridine.HCl

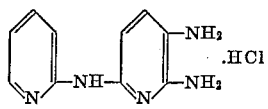

50 g. of 2 - amino - 3 - nitro-6-pyridyl-(2)-aminopyridine were hydrogenated analogously to Example 31. Isopropanolic HCl was added to the filtered reaction solution until it had an acid reaction whereupon the hydrochloride precipitated out. It decomposed at a temperature above 300° C. before melting. Yield=40 g.

Example 34

2-anilino-3-amino-6-chloro-pyridine

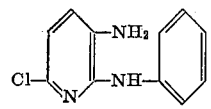

60 g. of 2-anilino-3-nitro-6-chloro-pyridine were hydrogenated in 500 ml. of ethanol with Raney nickel as catalyst at a gauge pressure of 20 atmospheres. Upon addition of water the hydrogenated product crystallized out of the reaction solution. The yield was 30 g. (57% of theory). Its melting point was 110–112° C. and the melting point of its hydrochloride was 232–233° C.

Example 35

2-anilino-3-carbethoxyamino-6-chloro-pyridine

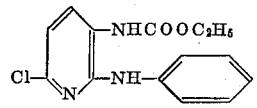

9 g. of chloroformic acid ethyl ester and 7 g. of pyridine were added to 19 g. of the product of Example 34 in 100 ml. of dioxane while stirring. The mixture was refluxed for 1 hour and the reaction product precipitated out by addition of water. The product was recrystallized from methanol/water. Its melting point was 130–131° C. Yield=13 g. (52% of theory).

Example 36

2-anilino-3-amino-6-methoxy-pyridine.HCl

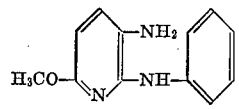

44 g. of 2-anilino-3-nitro-6-methoxy were hydrogenated with Raney nickel as described in Example 34. The hydrochloride of the reaction product was obtained directly from the hydrogenated solution by addition of isopropanolic HCl and ether. The hydrochloride thus obtained was reconverted to the free base with aqueous ammonia, such base filtered off, recrystallized from methanol/water and reconverted to the hydrochloride as above. Its melting point was 210° C. (with decomposition). Yield=24 g. (50% of theory).

Example 37

2-anilino-3,6-dicarbethoxyamino-pyridine.HCl

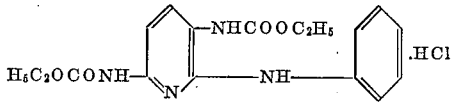

25 g. of 2-anilino-3-nitro-6-amino-pyridine were hydrogenated as described in Example 34. The base of the reaction product which was very sensitive to air was immediately mixed with 40 ml. of chloroformic acid ethyl ester and the mixture refluxed for 30 minutes. The reaction product was treated with 200 ml. of 20% aqueous ammonia, the precipitated product filtered off and washed with water. It was dissolved in acetone and converted to the hydrochloride by addition of isopropanolic HCl. The hydrochloride was recrystallized from methanol/ether. Its melting point was 176–178° C. Yield=9 g. 21% of theory).

*Example 38*

2,3-diamino-6-anilino-pyridine

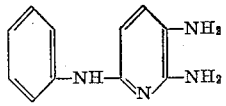

A mixture of 175 g. of 2-amino - 3 - nitro-6-anilino-pyridine, 60 g. of $Na_2SO_4$, 17.5 g. of Pd/carbon (10%) and 550 ml. of dioxane was hydrogenated at 80° C. under a guage pressure of 60 atmospheres. The contents of the autoclave were rapidly filtered under $N_2$. Upon addition of gasoline to the filtrate the base of the reaction product precipitated out in the form of weakly blue crystals. Its melting point was 144° C. Yield=115 g. (76% of theory).

*Example 39*

2-amino-3-carbethoxyamino-6-anilino-pyridine.HCl

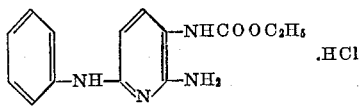

100 ml. of chloroformic acid ethyl ester were added to a solution of 100 g. of the product of Example 38 in 500 ml of dioxane whereupon the temperature of the mixture rose to 90° C. The mixture was stirred for 1 hour and then cooled to 0° C. and the precipitated crystals filtered off. After recrystallization from a little water the product had a melting point of 208–209° C. Yield=80 g. (52% of theory).

We claim:
1. A compound of the formula

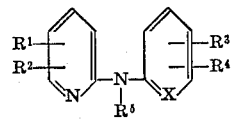

wherein X is selected from the group consisting of nitrogen and —CH—, $R^1$ is an aminocyl group $R^6NH$—, wherein $R^6$ is an acyl group derived from an acid selected from the group consisting of carbonic acid, mono lower alkyl esters of carbonic acid, lower alkanoic acids, benzoic acid, chloro substituted benzoic acids and hydroxy substituted benzoic acids, $R^2$ is selected from the group consisting of hydrogen, halogen, amino and acyl amino as defined for $R^1$, each of $R^3$ and $R^4$ are selected from the group consisting of hydrogen, halogen, trifluoromethyl, alkyl, alkoxy, carboxy and amino, the alkyl in the substituents indicated being lower alkyl and $R^5$ is selected from the group consisting of hydrogen and acyl as defined for $R^6$.

2. N-[2-phenylamino - pyridyl - (5)]-carbamic acid ethyl ester.
3. 2-phenylamino-5-acetamino-pyridine.
4. 2-(3-trifluoromethylphenylamino) - 5 - propionylamino-pyridine.
5. 2-amino - 3 - carbethoxy-amino - 6 - anilino-pyridine.HCl.

References Cited

UNITED STATES PATENTS 3,107,263   10/1963   Scherrer _____ 260—518

JOHN D. RANDOLPH, *Primary Examiner.*

WALTER A. MODANCE, *Examiner.*

A. ROTMAN, *Assistant Examiner.*